(12) United States Patent
Banjo et al.

(10) Patent No.: US 7,390,188 B2
(45) Date of Patent: Jun. 24, 2008

(54) RESIN MOLDING APPARATUS

(75) Inventors: Toshinobu Banjo, Kyoto (JP); Shigeru Hirata, Kyoto (JP); Masanori Shirasawa, Kyoto (JP)

(73) Assignee: Towa Corporation, Kyoto (JP)

(*) Notice: Subject to any disclaimer, the term of this patent is extended or adjusted under 35 U.S.C. 154(b) by 134 days.

(21) Appl. No.: 11/387,842

(22) Filed: Mar. 24, 2006

(65) Prior Publication Data

US 2006/0240140 A1 Oct. 26, 2006

(30) Foreign Application Priority Data

Apr. 22, 2005 (JP) ............................. 2005-124993

(51) Int. Cl.
*B29C 45/64* (2006.01)

(52) U.S. Cl. ..................................... 425/595; 425/451.9

(58) Field of Classification Search ................. 425/589, 425/595, 450.1, 451.9; 100/258 A
See application file for complete search history.

(56) References Cited

U.S. PATENT DOCUMENTS

| | | | |
|---|---|---|---|
| 5,249,951 A * | 10/1993 | Leonhartsberger et al. ....... | 425/451.9 |
| 5,556,656 A | 9/1996 | Lampl et al. | |
| 5,762,984 A | 6/1998 | Wimbauer | |
| 5,789,034 A * | 8/1998 | Urbanek ..................... | 425/589 |
| 5,800,843 A * | 9/1998 | Kappelmuller et al. ...... | 425/589 |
| 6,068,463 A * | 5/2000 | Urbanek ..................... | 425/595 |
| 6,132,198 A * | 10/2000 | Tamaki et al. ............... | 425/595 |
| 6,203,312 B1 * | 3/2001 | Romi ......................... | 425/595 |
| 2001/0053396 A1 | 12/2001 | Kappelmuller | |

FOREIGN PATENT DOCUMENTS

| | | |
|---|---|---|
| DE | 195 11 808 A1 | 12/1995 |
| JP | 7-308934 A | 11/1995 |
| JP | 8-207051 A | 8/1996 |
| JP | 10-217302 A | 8/1998 |

* cited by examiner

*Primary Examiner*—James Mackey
(74) *Attorney, Agent, or Firm*—Birch, Stewart, Kolasch & Birch, LLP

(57) ABSTRACT

A resin molding apparatus includes a fixing member to which a top mold is attached, a movable member to which a bottom mold is attached, a push-up member provided below the movable member, a drive mechanism moving the push-up member in upward/downward direction, and a flexible joint provided between the movable member and the push-up member. The push-up force of the drive mechanism is transmitted from the push-up member via the flexible joint to the movable member. Thus, a crack does not occur at a connection portion between the push-up member and the movable member. Therefore, a gap is not created between the top mold and the bottom mold. As a result, an excellent molded product is formed.

2 Claims, 5 Drawing Sheets

RESIN MOLDING APPARATUS

This nonprovisional application is based on Japanese Patent Application No. 2005-124993 filed with the Japan Patent Office on Apr. 22, 2005, the entire contents of which are hereby incorporated by reference.

BACKGROUND OF THE INVENTION

1. Field of the Invention

The present invention relates to a resin molding apparatus that forms a molded product.

2. Description of the Background Art

Conventionally, resin molding of a molded product (for example, a substrate to which an electronic component is attached) has been performed with a resin molding apparatus (hereinafter simply referred to as "an apparatus" also).

The apparatus includes, as shown in Japanese Patent Laying-Open No. 8-207051 (page 3, FIG. 4), a top mold and a bottom mold facing the same. The top mold is attached to the bottom face of a fixing member. The bottom mold is attached to the top face of a movable member. The fixing member and the movable member are supported by a post. The fixing member is fixed to the post. The movable member is moved in the upward/downward direction along the post by a drive mechanism. Thus, the movable member moves toward or away from the fixing member. The drive mechanism has two sets of link mechanisms. The two sets of link mechanisms are connected to the bottom face of the central portion of the movable member. Accordingly, the movable member moves in the upward/downward direction by the two sets of link mechanisms bending and expanding.

In the conventional apparatus as described above, the drive mechanism pushes up the central portion of the movable member when the top and bottom molds are clamped. As a result, the bottom mold is warped upwardly in a convex manner. Thus, the bottom mold pushes up the top mold. Accordingly, the top mold and the fixing member are warped upwardly in a convex manner. Here, if the top mold deforms to be in a warped shape corresponding to the warped shape of the bottom mold, no gap is created between the top and the bottom molds. Thus, resin is molded without any resin burr.

In the conventional apparatus as described above, when a mold-opening operation and a mold-clamping operation are successively conducted, the movable member is warped upwardly in a convex manner and returned to the original state. Additionally, the movable member and the drive mechanism are rigid-joined (fixed-joined). Therefore, a connection portion between the movable member and the drive mechanism receives stress concentration, which results in a crack at that connection portion. Thus, sufficient push-up force cannot be provided from the drive mechanism to the movable member and to the bottom mold. Thus, the warped shape of the top mold and that of the bottom mold do not correspond to each other. That is, a gap is created between the top mold and the bottom mold. As a result, molten resin enters the gap. Thus, a resin burr is formed with the molded product.

The present invention is made to solve the above-described problem, and its object is to provide a resin molding apparatus wherein formation of resin burr is prevented.

SUMMARY OF THE INVENTION

A resin molding apparatus according to one aspect of the present invention includes: a fixing member to which a top mold is attached; a movable member to which a bottom mold is attached; a push-up member provided below the movable member; a drive mechanism moving the push-up member in upward/downward direction; and a flexible joint provided between the movable member and the push-up member. The push-up force of the drive mechanism is transmitted from the push-up member via the flexible joint to the movable member. Thus, the movable member and the push-up member are not rigid-jointed (fixed-joined), but rotatably connected. Accordingly, a connection portion between the movable member and the push-up member is not damaged by stress concentration due to the warp of the movable member. Therefore, the top mold can always elastically deform so as to correspond to the bottom mold. As a result, creation of a gap between the top mold and the bottom mold is prevented. Thus, formation of a resin burr is prevented.

The flexible joint may be made of a spherical member. The movable member may have a spherical seat that is hemispherical to which the spherical member is fitted. The push-up member may have a spherical seat that is hemispherical to which the spherical member is fitted. Thus, stress concentration at a connection portion due to the warp of the movable member is prevented, while the structure for transmitting the push-up force from the push-up member to the movable member is simplified.

A resin molding apparatus according to another aspect of the present invention includes: a fixing member to which a top mold is attached; a movable member to which a bottom mold is attached; a push-up member connected to a bottom face of the movable member; and a drive mechanism moving the push-up member in upward/downward direction. The fixing member and the push-up member each have a structure attaining elastic deformation to prevent a gap from being created between the top mold and the bottom mold when the top mold and the bottom mold are clamped by the drive mechanism. This also prevents formation of a resin burr.

Desirably, the fixing member and the push-up member each have a structure attaining elastic deformation to maintain the sliding state of a sliding portion of the movable member and a sliding portion of a post when the movable member slides in upward/downward direction along the post that extends in the upward/downward direction. Thus, the sliding resistance between the post and the movable member is prevented from being further increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

In FIG. 5, the warped fixing member and push-up member are exaggerated by dashed lines for purposes of clear illustration.

DETAILED DESCRIPTION OF THE INVENTION

Figure 1:
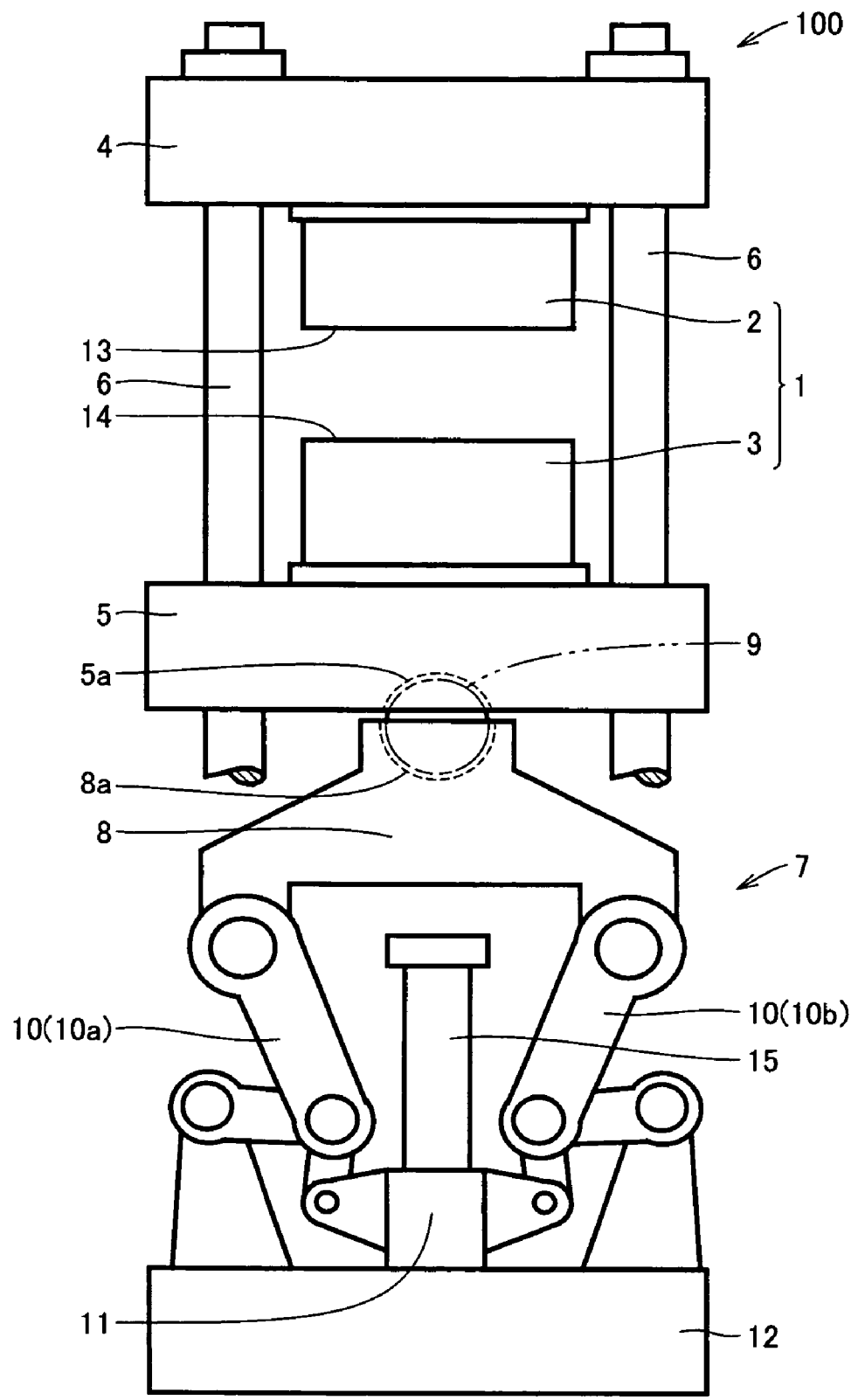
FIG. 1 shows a resin molding apparatus of a first embodiment in a mold-open state.

In the following, referring to the drawings, a resin molding apparatus in embodiments of the present invention will be described.

First Embodiment

First, referring to FIGS. 1 and 2, a resin molding apparatus 100 (hereinafter referred to as "apparatus 100") of a first embodiment of the present invention will be described.

As shown in FIG. 1, apparatus 100 includes a mold 1 of a two-piece structure. Mold 1 has a top mold 2 and a bottom mold 3 facing the top mold 2. Top mold 2 has a top mold face 13, and bottom mold 3 has a bottom mold face 14. Top mold face 13 and bottom mold face 14 contact to each other in a mold-clamp state. Inside mold 1, a molded product sealed by resin is formed. The molded product may be a substrate to which an electronic component sealed by resin is attached, for example.

Although not shown in the drawings, mold 1 is provided with a mechanism for heating mold 1 to a prescribed temperature. Mold 1 may have a three-piece structure instead of the two-piece structure. The three-piece structure refers to a structure having an intermediate mold between top mold 2 and bottom mold 3.

Mold 1 may be of the type for conducting transfer molding, or for conducting compression molding. Further, it may be of the type with which release films for improving the mold release characteristics are inserted between the mold faces and cured resin. Still further, mold 1 may be of the type for conducting vacuum forming in a state where the gap between top mold face 13 and bottom mold face 14 is sealed by a seal member. A combination of such mold structures may be employed.

The molded product may include any printed circuit board, such as a wire bonding substrate, a flip-chip substrate, and a wafer substrate. Further, the shape of the substrate may be any shape including a circle and polygons. The material of the substrate may be anything, such as metal, plastic, ceramic, glass, and any other material. Resin as the material of the resin-molded product may be any of tablet-type resin, liquid resin, granulated resin, and powdered resin.

As shown in FIG. 1, in apparatus 100, top mold 2 is attached to the bottom face of fixing member 4. Bottom mold 3 is attached to the top face of movable member 5. Fixing member 4 and movable member 5 are supported by a plurality of (in this case, four) posts 6. Fixing member 4 is fixed to posts 6. Movable member 5 can slide in the upward/downward direction along posts 6. Movable member 5 is moved by drive mechanism 7. To the bottom face of the central portion of movable member 5, a push-up member 8 is connected via a flexible joint 9. In other words, flexible joint 9 is interposed between movable member 5 and push-up member 8. Thus, push-up force of drive mechanism 7 is transmitted from push-up member 8 via flexible joint 9 to movable member 5. Accordingly, a crack does not occur in a connection portion between movable member 5 and push-up member 8 due to stress concentration therein. Additionally, drive mechanism 7 is capable of moving only movable member 5 along posts 6 in the upward/downward direction without moving fixed member 4.

Figure 2:
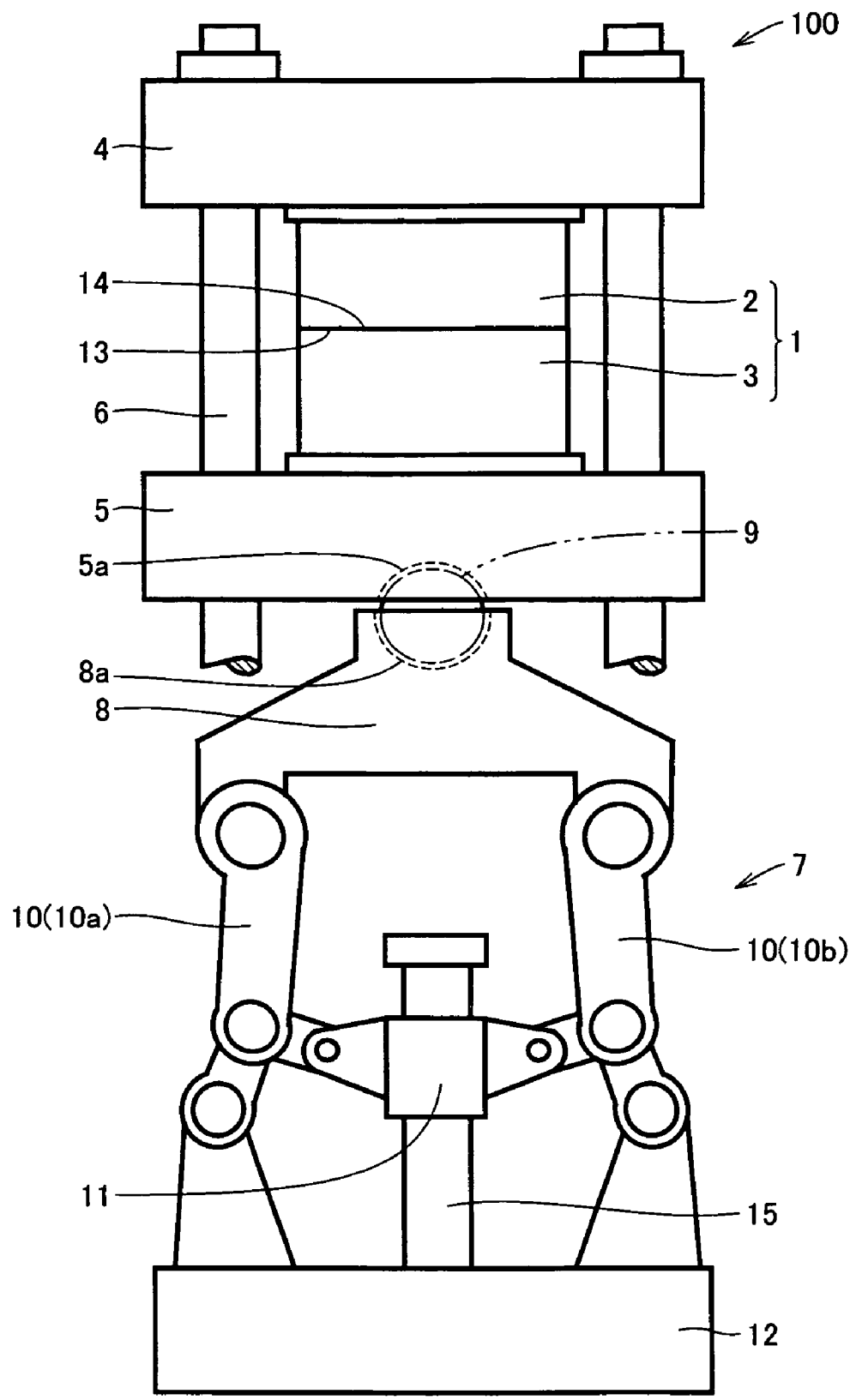
FIG. 2 shows the resin molding apparatus of the first embodiment in a mold-clamped state.

As shown in FIGS. 1 and 2, drive mechanism 7 has a plurality of sets of (in this case, two sets of) link mechanisms 10 (10a, 10b). Link mechanism 10 has two links each connected via a pin. The two links can rotate around the axis of the pin to change into a bent state shown in FIG. 1 and to change into an extended state shown in FIG. 2. Thus, push-up mechanism 8 and movable member 5 can move in the upward/downward direction. Drive mechanism 7 includes a drive source 11 having a cylinder and a motor, and a base 12 to which link mechanisms 10 are attached and a plurality of posts 6 are fitted.

Flexible joint 9 is a spherical member and fitted into a hemispheric spherical seat 5a of movable member 5 and into a hemispheric spherical seat 8a of push-up member 8. Flexible joint 9 is a member transmitting push-up force of drive mechanism 7 to movable member 5. However, flexible joint 9 does not transmit moment generated by a warp of movable member 5 to push-up member 8. Specifically, when movable member 5 is warped, spherical seat 5a of the movable member 5 and spherical seat 8a of push-up member 8 each slides on flexible joint 9. Thus, stress would not concentrate at a connection portion between push-up member 8 and movable member 5 when movable member 5 deforms. Accordingly, the trouble of crack generation at the connection portion is not invited. It is noted that flexible joint 9 may be any member such as a disc-like member of a narrow width, a pin-like member, and a seismic isolation stacked rubber wherein a plate-like rubber and a metal plate are alternately stacked, so long as it can transmit the push-up force of drive mechanism 7 to movable member 5 without incurring stress concentration at the connection portion due to the warp of movable member 5.

Next, an operation of apparatus 100 is described.

First, when opening top mold 2 and bottom mold 3, drive source 11 moves downwardly. Thus, link mechanisms 10 (10a, 10b) are bent inwardly as shown in FIG. 1. Here, fixing member 4 and movable member 5 are in parallel to each other. Top mold face 13 and bottom mold face 14 face each other with a prescribed space between them. Both top mold face 13 and bottom mold face 14 are horizontally held. Next, as shown in FIG. 2, when clamping top mold 2 and bottom mold 3, drive source 11 moves upwardly along a rail 15. Thus, link mechanisms 10 are extended in the upward/downward direction. As a result, push-up member 8 moves upwardly. Movable member 5 moves upwardly along posts 6. Accordingly, bottom mold 3 also moves upwardly. Finally, bottom mold face 14 of bottom mold 3 abuts top mold face 13 of top mold 2. This completes clamping of top mold 2 and bottom mold 3.

In the above-described clamped state, push-up force of drive mechanism 7 is exerted on fixing member 4, via push-up member 8, movable member 5, bottom mold 3 and top mold 2. As a result, fixing member 4 is warped in a convex manner. Here, movable member 5 is warped by the push-up force of drive mechanism 7 as well. In other words, fixing member 4 and movable member 5 are warped in the same direction (upwardly convex).

It is noted that a gap must not be formed between top mold 2 and bottom mold 3. It is therefore desirable that the warped state of movable member 5 substantially corresponds to that of fixing member 4. Accordingly, in apparatus 100 of the present embodiment, fixing member 4 and movable member 5 are the same in the thickness in the vertical direction. More specifically, fixing member 4 preferably has substantially the same size, shape and rigidity as that of movable member 5.

As movable member 5 and push-up member 8 are connected via flexible joint 9, a crack generation in a connection portion between movable member 5 and push-up member 8 is prevented by the function of flexible joint 9 even when movable member 5 is warped greatly by the pressure of drive mechanism 7. Thus, when top mold 2 and bottom mold 3 are clamped, and fixing member 4, movable member 5, top mold 2, and bottom mold 3 are warped, top mold 2 is always warped so as to conform to the warped state of bottom mold 3. As a result, generation of a gap between top mold 2 and bottom mold 3 is prevented. Accordingly, generation of resin burr is prevented.

Next, a resin molding process conducted with apparatus 100 is described.

When apparatus 100 of the present embodiment is used, first, as shown in FIG. 1, a molded product is set on bottom mold face 14 in a state where top mold 2 and bottom mold 3 are open. Additionally, a resin material is set inside a pot formed in bottom mold 3.

Next, drive source 11 of drive mechanism 7 moves upwardly along rail 15, whereby push-up member 8 moves upwardly. Movable member 5 moves upwardly along posts 6. Here, bottom mold 3 moves upwardly as well.

Next, top mold face 13 abuts bottom mold face 14. In other words, apparatus 100 enters the clamped state shown in FIG. 2. Here, in apparatus 100, push-up force of drive mechanism 7 is transmitted to fixing member 4, via push-up member 8, movable member 5, bottom mold 3, and top mold 2. As a result, fixing member 4 is warped in a convex manner. Here, movable member 5 is warped in a convex manner conforming to the convex shape of fixing member 4. Accordingly, top mold 2 is warped in a convex manner so as to conform to the convex warp of bottom mold 3.

Next, as shown in FIG. 2, a plunger in the pot is pressed in the state where top mold 2 and bottom mold 3 are clamped. Thus, molten resin is introduced into mold 1 through resin passages respectively provided in top mold 2 and bottom mold 3. It is noted that a not-shown resin introducing mechanism may be of any type so long as it can introduce molten resin into mold 1.

Thereafter, molten resin is cured inside mold 1. Thus, the molded product is completed. Next, mold 1 is opened. That is, apparatus 100 enters from the state shown in FIG. 2 into the state shown in FIG. 1.

When opening mold 1, in apparatus 100, drive source 11 moves downwardly along rail 15. Thus, link mechanisms 10 are bent, and whereby push-up member 8 moves downwardly. Here, movable member 5 moves downwardly along posts 6. Bottom mold 3 moves downwardly as well. As a result, fixing member 4, movable member 5, top mold 2 and bottom mold 3 return to the initial state from the warped state. Thereafter, the molded product is removed from bottom mold 3.

While the resin molding apparatus constituted by a single apparatus 100 is shown, a resin molding apparatus of a module structure wherein a plurality of apparatuses 100 are integrated may be employed.

Second Embodiment

Figure 3:
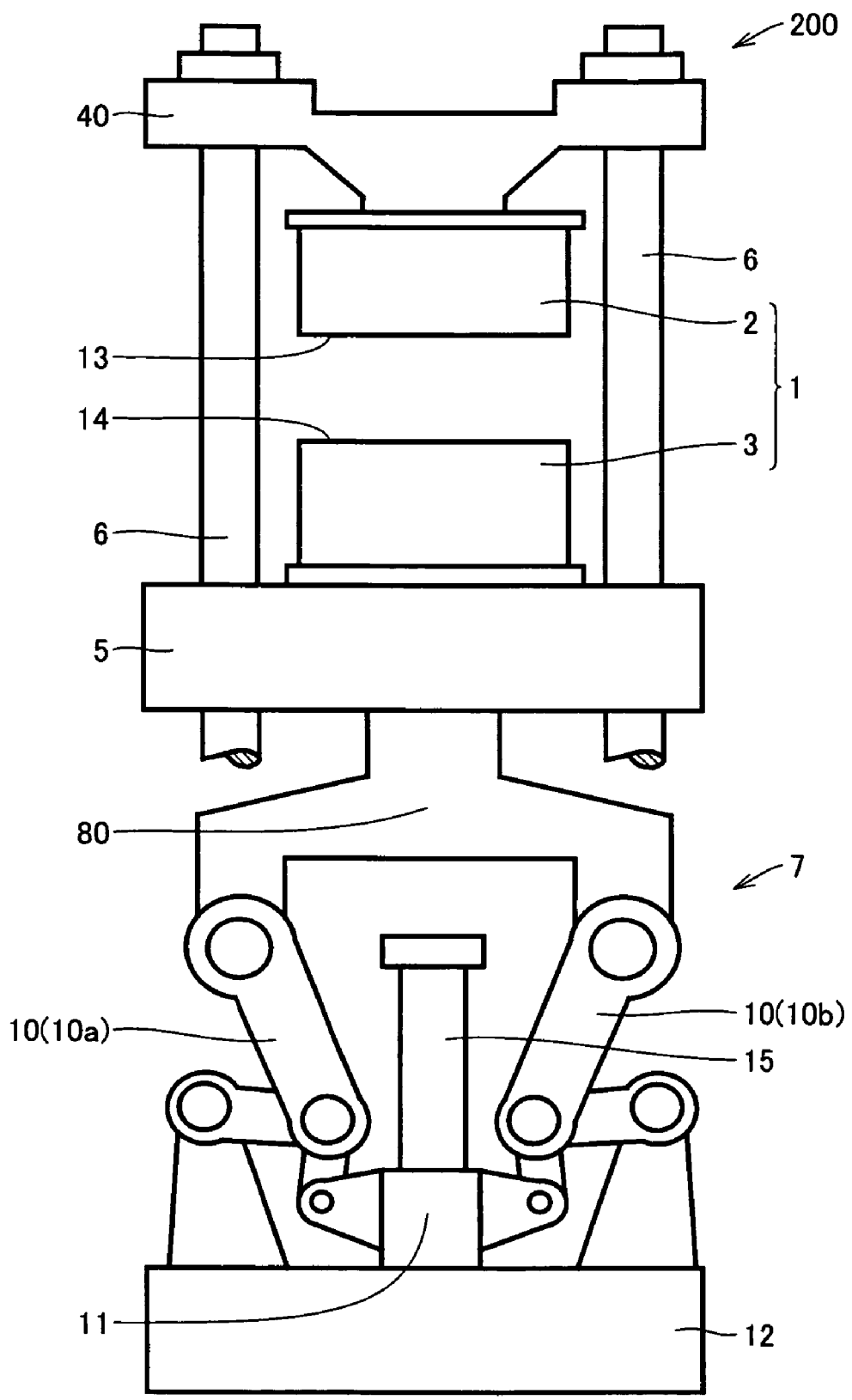
FIG. 3 shows a resin molding apparatus of a second embodiment in a mold-open state.
Figure 4:
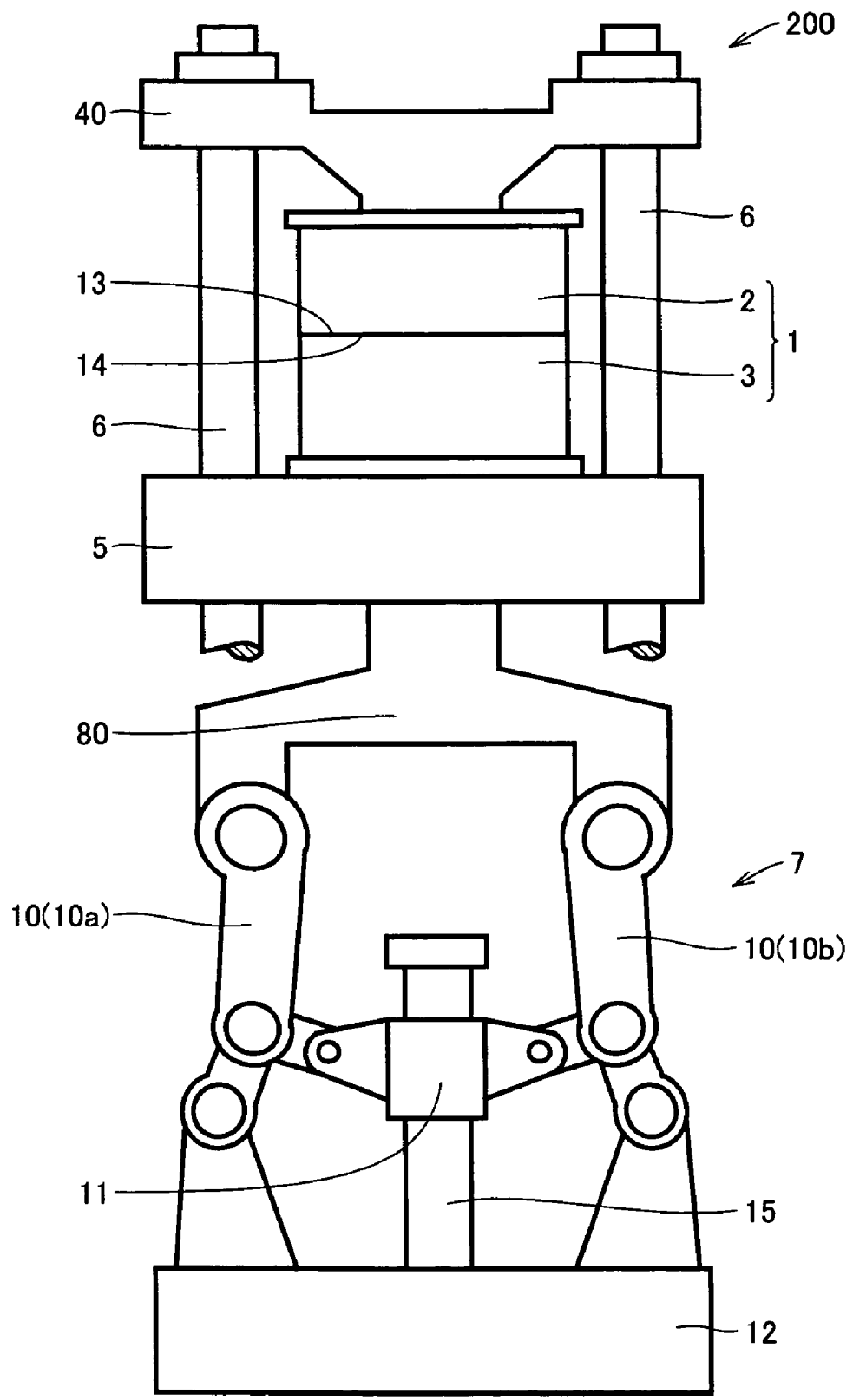
FIG. 4 shows the resin molding apparatus of the second embodiment in a mold-clamped state.

Next, referring to FIGS. 3-5, a resin molding apparatus 200 (hereinafter referred to as "apparatus 200") of a second embodiment of the present invention is described.

The structure and operation of resin molding apparatus 200 of the present embodiment are substantially identical to those of apparatus 100 of the first embodiment. Accordingly, in the description of apparatus 200 of the present embodiment, the structure and operation similar to those of apparatus 100 of the first embodiment will not be repeated.

Resin molding apparatus 200 of the present embodiment is different from apparatus 100 of the first embodiment in that an elastically deforming push-up member 80 is provided in place of push-up member 8 of high rigidity, that an elastically deforming fixing member 40 is provided in place of fixing member 4 of high rigidity, and that flexible joint 9 is not provided. However, a flexible joint similar to flexible joint 9 employed in apparatus 100 of the first embodiment may be provided in apparatus 200 of the present embodiment as well.

Fixing member 40 of the present embodiment has functions as a member that elastically deforms and functions as a member fixing top mold 2 to posts 6. However, an elastically deforming member to which top mold 2 is attached and a member fixing the elastically-deforming member to posts 6 may separately be provided so long as the elastically-deforming member is connected to the central portion of top mold 2.

Figure 5:
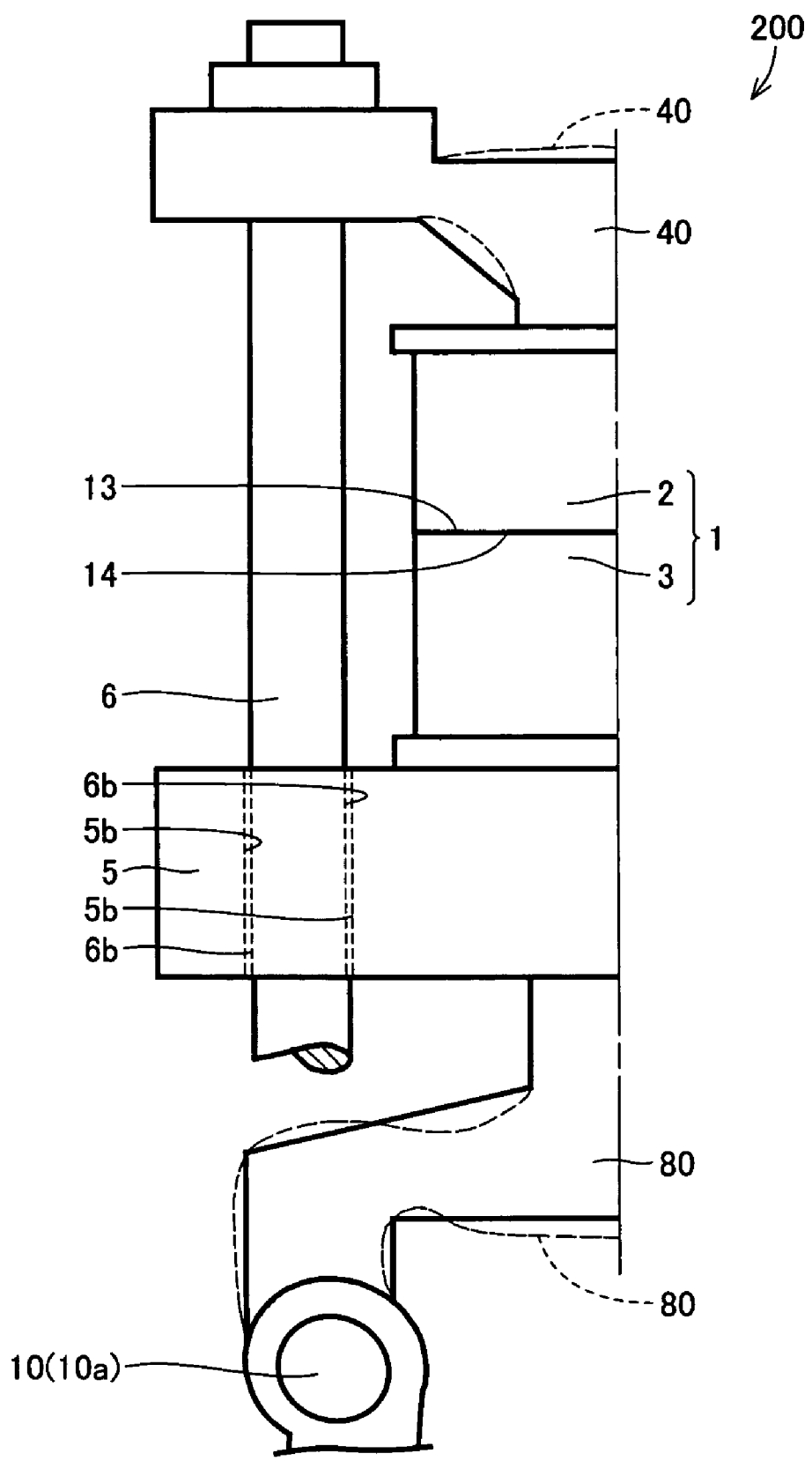
FIG. 5 is an enlarged view of a substantial part of the resin molding apparatus of the second embodiment, wherein a fixing member and a push-up member are warped.

In the present embodiment, as shown in FIG. 5, when top mold 2 and bottom mold 3 are clamped, push-up force of drive mechanism 7 is provided to push-up member 80, movable member 5, bottom mold 3, top mold 2, and fixing member 40. By this push-up force, substantially only fixing member 40 and push-up member 80 elastically deform. As a result, in apparatus 200 of the present embodiment, fixing member 40 and push-up member 80 each absorb the push-up force of the drive mechanism 7 by means of elastic deformation. That is, as shown in FIG. 5, in apparatus 200 of the present embodiment, fixing member 40 and push-up member 80 both flex by the push-up force of drive mechanism 7 when top mold 2 and bottom mold 3 are clamped, while the other members do not deform substantially. Accordingly, even if top mold 2 and bottom mold 3 are repeatedly opened and clamped, a crack due to stress concentration at a connection portion between movable member 5 and push-up member 80 does not occur.

Movable member 5 and push-up member 80 always deform so that a gap is prevented from being created between top mold 2 and bottom mold 3. More specifically, in the present embodiment, fixing member 40 and push-up member 80 elastically deform so that the arrangement of movable member 5 relative to posts 6 is constantly maintained while movable member 5 moves along posts 6. Thus, the state where top mold face 13 and bottom mold face 14 are horizontal is always maintained. That is, while movable member 5 moves along posts 6, the fixing member and the push-up member elastically deform so that the sliding state of sliding portions 6b of posts 6 and sliding portions 5b of movable member 5 is maintained substantially the same. As a result, a state where the sliding resistance between each of a plurality of posts 6 and movable member 5 is minimized is maintained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A resin molding apparatus, comprising:
a fixing member to which a top mold is attached;
a movable member to which a bottom mold is attached;
a push-up member connected to a bottom face of said movable member; and
a drive mechanism moving said push-up member in upward/downward direction,
wherein the fixing member is fixed to a plurality of posts and the fixing member has a central portion, and
each of said fixing member and said push-up member has a structure attaining elastic deformation, whereby the drive mechanism applies a force which resiliently deforms the central portion of the fixing member and also resiliently deforms the push-up member, in order to prevent a gap from being created between said top mold and said bottom mold when said top mold and said bottom mold are clamped by said drive mechanism, said push-up member having a structure which maintains a sliding state of a sliding portion of said movable member with respect to a sliding portion of at least one of said posts when said movable member slides in upward/downward direction along said posts that extend in the upward/downward direction.

2. The resin molding apparatus according to claim 1, wherein a flexible joint is provided between said movable member and said push-up member, a push-up force of said drive mechanism is transmitted from said push-up member via said flexible joint to said movable member, and wherein said flexible joint is made of a spherical member, said movable member has a spherical seat that is hemispherical in which said spherical member is seated, and said push-up member has a spherical seat that is hemispherical to which said spherical member is seated.

* * * * *